US 6,644,092 B1

(12) United States Patent
Oppel

(10) Patent No.: US 6,644,092 B1
(45) Date of Patent: Nov. 11, 2003

(54) AUTOMATIC CALIBRATION OF PRESSURE SENSORS FOR PAINT BOOTH AIRFLOW CONTROL

(76) Inventor: Robert J. Oppel, 197 Forum Pkwy., Rural Hall, NC (US) 27045

( * ) Notice: Subject to any disclaimer, the term of this patent is extended or adjusted under 35 U.S.C. 154(b) by 304 days.

(21) Appl. No.: 09/854,736

(22) Filed: May 14, 2001

(51) Int. Cl.[7] .............................................. G01L 27/00
(52) U.S. Cl. ........................................ 73/1.61; 73/1.62
(58) Field of Search ..................... 73/1.59, 1.61–1.64; 118/712, 719, 314, 326; 434/50–52

(56) References Cited

U.S. PATENT DOCUMENTS

| | | | |
|---|---|---|---|
| 4,051,712 A | * | 10/1977 | Zias et al. .................... 73/1.62 |
| 4,102,175 A | * | 7/1978 | Foster ......................... 73/1.64 |
| 4,378,523 A | * | 3/1983 | Norman ....................... 73/1.61 |
| 4,658,829 A | * | 4/1987 | Wallace ....................... 73/1.64 |
| 4,730,553 A | | 3/1988 | Osawa et al. |
| 4,781,107 A | | 11/1988 | Nilsson |
| 5,095,811 A | | 3/1992 | Shutic et al. |
| 5,275,035 A | * | 1/1994 | Baer ........................... 73/1.61 |
| 5,336,131 A | | 8/1994 | Crider et al. |
| 5,356,335 A | | 10/1994 | Matsui et al. |
| 5,385,505 A | | 1/1995 | Sharp et al. |
| 5,402,666 A | * | 4/1995 | Chalpin ....................... 73/1.59 |
| 5,480,349 A | | 1/1996 | Kolta |
| 5,545,086 A | | 8/1996 | Sharp et al. |
| 5,607,498 A | | 3/1997 | Reighard et al. |
| 5,720,658 A | | 2/1998 | Belusa |
| 5,820,456 A | | 10/1998 | Nelson |
| 5,902,925 A | * | 5/1999 | Crispie et al. ............... 73/1.62 |
| 5,951,394 A | | 9/1999 | Pariseau |
| 6,033,302 A | | 3/2000 | Ahmed et al. |
| 6,146,264 A | | 11/2000 | Tong et al. |

* cited by examiner

*Primary Examiner*—Robert Raevis
(74) *Attorney, Agent, or Firm*—MacCord Mason PLLC

(57) ABSTRACT

A paint booth airflow control system is described for preventing paint particles and other contaminates from entering adjacent paint booth sections by equalizing air pressure differences between adjacent sections. Pressure sensors in communication with adjacent paint booth sections report pressure differences between the adjacent sections to an airflow controller. Responsive to the reported pressure differences the airflow controller adjusts paint booth airflow to equalize the pressure between adjacent sections. In order to maintain pressure measurement accuracy, automatic calibration modules periodically calibrate all pressure sensors to pneumatic references.

21 Claims, 2 Drawing Sheets

AUTOMATIC CALIBRATION OF PRESSURE SENSORS FOR PAINT BOOTH AIRFLOW CONTROL

BACKGROUND OF THE INVENTION

1. Field of the Invention

The present invention relates to the control of airflow between adjacent sections of a paint booth.

2. Description of the Prior Art

Durable goods such as vehicles and appliances require protective coatings. Generally, protective coatings are added to such objects from inside the protective environment of multi-section enclosures commonly referred to as coating or paint booths. Typically, coatings of several types and pigments are applied to objects as they are conveyed through a paint booth. Usually, only one type of coating is applied per section of paint booth. For example, a first section may be used to apply a primer coat, another section may be used to apply a pigment and a final section could be used to apply a clear coat.

No matter what type of coating is being applied, a clean environment inside each paint booth section free of detrimental substances such as dirt, dust and organic solvents must be maintained. The paint booth enclosure alone limits to some degree the amount of coating contaminants present inside each paint booth section. Never the less, a significant amount of contaminants still exist inside each paint booth section. These contaminants must be prevented from coming into contact with freshly applied coatings.

One way to prevent contaminants from coming in contact with fresh uncured coatings is to force clean air to flow vertically from vents in the top of the paint booth to returns in the bottom. Downward airflow helps prevent contaminants from becoming suspended inside the paint booth.

Unfortunately, the downward airflow used to solve the problem of suspended contaminants creates another problem by generating unequal static pressures between adjacent sections. The higher static pressure of one paint booth section relative to another forces airborne paint particles to migrate to the lower pressure section. Walls placed between adjacent sections only moderately reduce the number of paint particles transported because the walls must have openings through which objects can pass.

Transported paint particles become coating contaminants when they drift into other sections. For example, white-pigment paint particles migrating from one paint booth section into another containing an object with an uncured black-pigment finish coat would be disastrous.

Prior art airflow control systems have been designed to minimize paint particle migration between adjacent sections of a paint booth. One such system uses ultrasonic anemometer sensors to measure airflow between adjacent paint booth sections. The airflow measurements are sent to an air handling system that increases or decreases the airflow in each paint booth section. Unfortunately, ultrasonic anemometers cannot accurately measure airflow rates as low as those that transport paint particles between sections.

Another system uses pressure sensors to measure pressure differences between adjacent paint booth sections. An air handling system responds to the pressure sensors by adjusting the airflow of each section. While this approach is sound in theory, it is unsatisfactory in a practical sense because factory calibrations of low-pressure sensors are very short-lived. In other words, the output of low pressure sensors significantly drift off calibration unacceptably soon, especially when set to measure differential pressures as low as those responsible for the transport of the undesired paint particles.

As described above, the purpose of paint booths are to prevent the contamination of uncured coatings by providing an environment free from particles nd substances that would otherwise mix with the coatings applied to an object, harming the object's finish. While the enclosure of a paint booth along with the introduction of clean air into its sections go towards providing an environment suitable for applying coatings to durable goods such as vehicles and appliances the problem of paint migration between adjacent sections remains. A solution to this problem will provide a major benefit in that costly rework and refinishing of coated objects now common will be eliminated.

SUMMARY OF THE INVENTION

It has been found that the migration of undesirable paint particles from one paint booth section to another can be significantly reduced by maintaining substantially equal static pressures between paint booth sections. Pressure sensors are used to measure the static pressure inside paint booth sections. An airflow controller uses static pressure measurements from the paint booth sections to determine the level of airflow adjustment needed to equalize the pressure in adjacent sections. Frequent calibration of all pressure sensors during the continuous operation of a paint booth is necessary because pressure sensors rapidly drift away from calibration when used to make measurements with the accuracy needed to determine airflow adjustments.

The present invention is a system for calibrating pressure sensors used to measure the static pressure inside adjacent paint booth sections. The system includes a pressure sensor, an amplifier and an amplifier controller for each paint booth section. A processor connects a low-pressure reference and a high-pressure reference to each of the pressure sensors in a sequential manner. The amplifier controller adjusts the amplifier output to zero based on the low-pressure reference. Likewise, the amplifier controller adjusts the amplifier to a preset value based on the high-pressure reference. When referring to "zero" as a procedure it is to be understood that it is unnecessary for any output to physically go to zero volts or zero amperes, etc. Instead the term "zero" in the case of the present invention includes multiple points of calibration. For example, to "zero" an output the user may select a voltage set point of perhaps—100 mV.

The present invention further provides an airflow controller that uses the static pressure measurements from inside paint booth sections to determine the level of airflow needed to reach static pressure equilibrium between adjacent paint booth sections. Each amplifier is in communication with an airflow controller that may be as simple as a motor controller in command of a blower. The blower in turn generates airflow into the booth section in which pressure is measured by a corresponding pressure sensor. An increase in airflow entering or a decrease in the airflow exiting a booth section will increase the pressure inside the section. Likewise, a decrease in the airflow entering or an increase in the airflow exiting a booth section will result in a decrease in pressure inside the section. Consequently, the pressure inside the booth can be maintained at a level that is equal to that of neighboring booth sections. Equalized pressured between adjacent sections results in minimized airflow between adjacent sections.

Also, a method is disclosed in which a micro-controller controls the sequence of automatic zero and automatic span procedures that recalibrate all pressure sensors on an automatically adjustable time schedule. The pressure sensors are recalibrated frequently, in both zero offset and span; as a result all sensors output equivalent signals for an equivalent pressure. This level of accuracy and equivalence of pressure measurement an air flow controller can be set to maintain the pressure of each paint booth section such that pressure differences between sections is reduced to a level that drastically reduces the transport of paint particles between sections.

DETAILED DESCRIPTION OF THE PREFERRED EMBODIMENT

Figure 1:
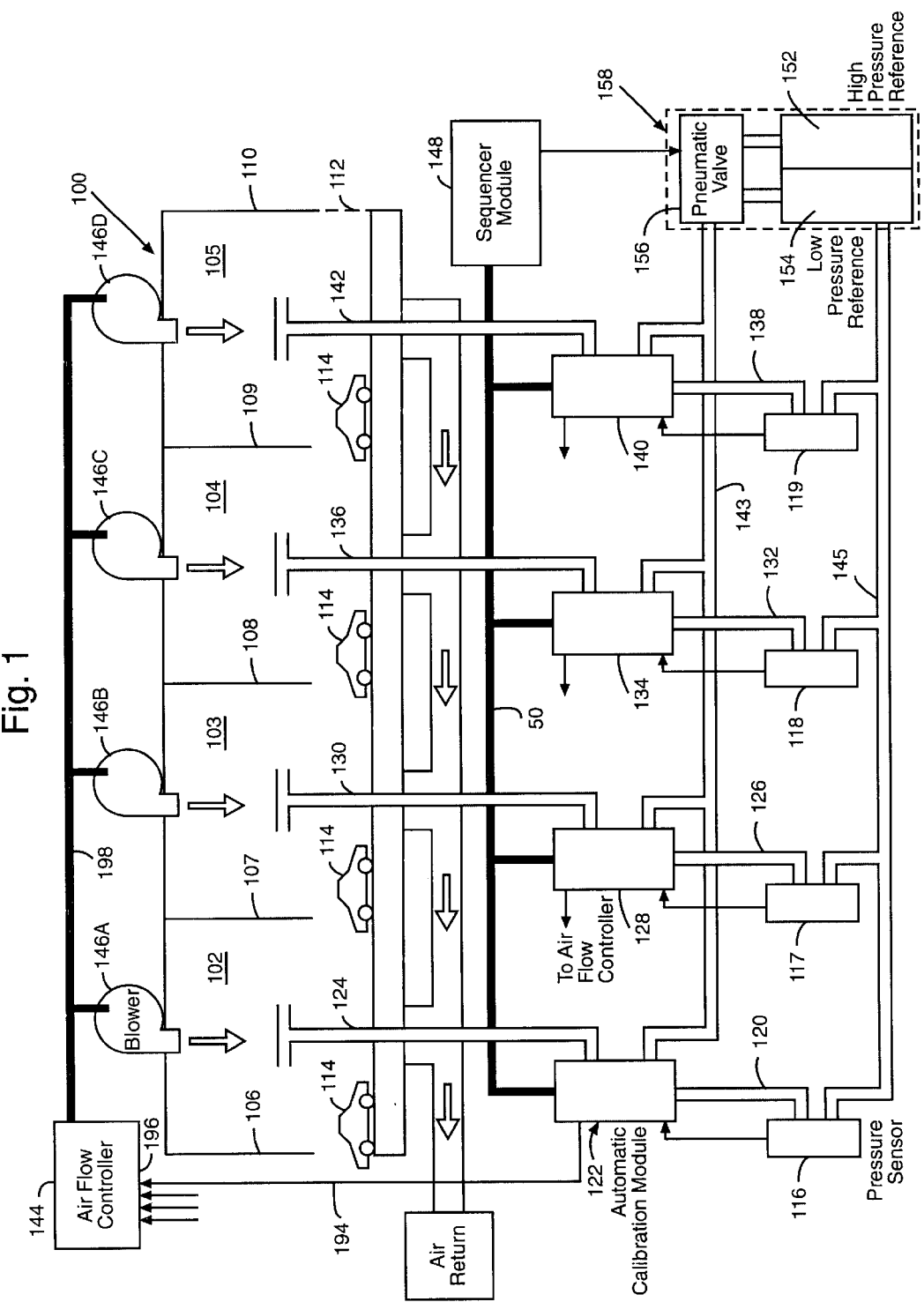
FIG. 1 is a diagram illustrating an embodiment of the present invention.

In the following description, like reference characters designate like or corresponding parts throughout the several views. Also in the following description, it is to be understood that such terms as high, low, top, bottom, vertical, horizontal, zero, span and the like, are used solely for the purpose of clarity in illustrating the invention, and should not be taken as words of limitations.

The present invention minimizes airflow rates of air flowing between adjacent sections of a paint booth by maintaining a static pressure inside each paint booth section to a level substantially equal to the static pressure inside all other paint booth sections. This is accomplished by a periodic cycle of steps that automatically calibrates the zero set point and span of all pressure sensors after which a measurement of the static pressure of each paint booth section is transmitted to an air flow controller that in turn adjusts the static pressure inside each paint booth section.

As shown in FIG. 1 a paint booth 100 is made up of adjacent sections 102, 103, 104, and 105. Section 102 is partially closed by partition 106. Sections 102 and 103 are separated by partition 107. Sections 103 and 104 are separated by partition 108. Sections 104 and 105 are separated by partition 109. Section 105 is closed by partition 110. Each partition, 106, 107, 108, and 109 has an opening 112 through which cars 114 are passed. Furthermore, pressure sensors 116, 117, 118, and 119, one for each section, are pneumatically in communication with the static pressure of their respective paint booth section. For example, pressure sensor 116 is in intermittent communication with the static pressure of section 102 by way of, plumb work 120, automatic calibration module 122 and plumb work 124. Likewise, pressure sensors 117, 118, and 119 are in intermittent communication with their respective paint booth sections by way of, plumb work, 126, 132, 138, automatic calibration modules 128, 134, 140, and plumb work 130, 136 and 142 respectively.

An airflow controller 144 is adapted to adjust the static pressure of each individual section by controlling rotation speed of blowers 146. Airflow controller 144 receives a static air pressure measurement, one for each section, from the plurality of automatic calibration modules 122, 128, 134 and 140.

A sequencer module 148 automatically controls the sequence of the automatic calibration of each individual pressure sensor by way of a control bus 150. The sequencer module also selects between a high-pressure reference 152 and a low-pressure reference 154 by way of a pneumatic valve 156 at appropriate times during the calibration sequence. Taken together, pneumatic valve 156, high-pressure reference 152, and low-pressure reference 154 all inside a dashed box is referred to as a pneumatic reference selector 158.

Figure 2:
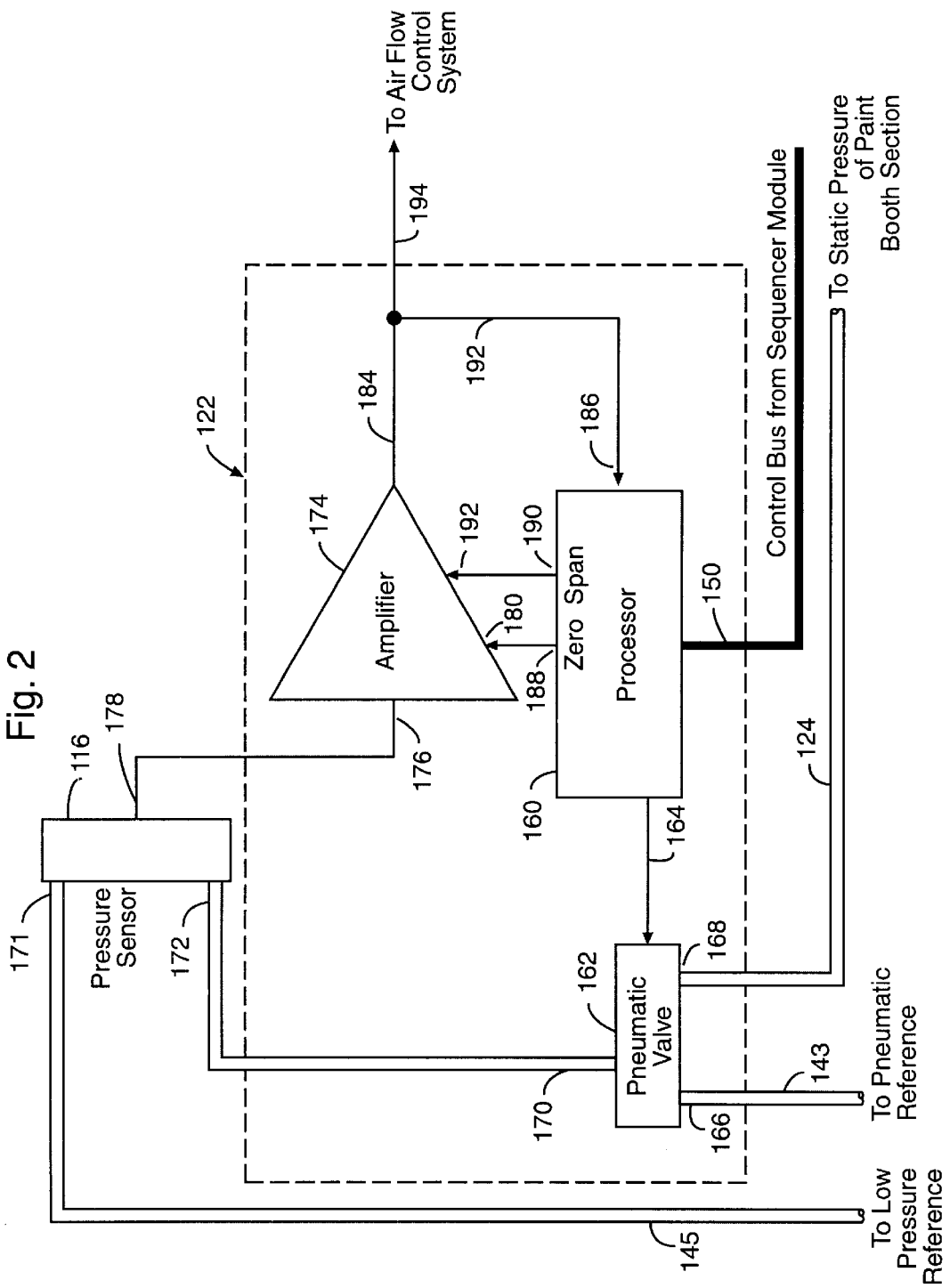
FIG. 2 is a schematic block diagram depicting an automatic calibration module.

Turning attention now to FIG. 2 the automatic calibration modules can been examined in greater detail. The contents inside the dashed box of FIG. 2 represent the components that make automatic calibration module 122.

A pneumatic valve 162 having a first pneumatic input port 166 is in communication with the pneumatic reference selector 158, a second pneumatic input port 168 is in communication with the static pressure of a paint booth section 102. A pneumatic output port 170 belonging to pneumatic valve 162 is in communication with the first pneumatic input port 172 of pressure sensor 116. An electronic amplifier 174 having an electrical input port 176 is in communication with the electrical output port 178 of pressure sensor 116. Electronic amplifier 174 also has a zero adjustment input 180, a span adjustment input 184 and an electrical output port 184.

An electronic processor 160 having an electrical input 186 connects to the electrical output port 184 of electronic amplifier 174 by way of feedback path 192. Also, electronic processor 160 has an output 164 for controlling pneumatic valve 162 as well as another output 188 for controlling the zero adjustment of amplifier 174. Another output 190 is used for controlling the span adjustment of amplifier 174. Finally, a communication path 194 connects the electrical output of electronic amplifier 174 to airflow controller 144.

A cyclical calibration process can begin by applying a low-pressure reference across both pneumatic inputs of each pressure sensor. This is done in order to set a zero reference output for the amplifier present in each automatic calibration module. For example refer to FIGS. 1 and 2 with particular interest being paid to the calibration of pressure sensor 116.

The action of applying a low-pressure reference across both pneumatic inputs 171 and 172 of pressure sensor 116 begins when sequencer 148 selects low-pressure reference 154 to be applied to the pneumatic reference input 166 of pneumatic valve 162. The sequencer selects the low-pressure reference of pneumatic reference selector 158 by sending a logic signal to pneumatic valve 156, commanding it to connect low-pressure reference 154 to pneumatic reference plumb work 143. Simultaneously, or shortly thereafter the sequencer 148 commands the processor 160 of automatic command module 122 to select the low-pressure pneumatic reference to be applied to the pneumatic input 172 of pressure sensor 116. Since pressure sensor 116's pneumatic input 171 is permanently plumbed to the low-pressure reference 154 of pneumatic reference selector 158 by way of plumb work 145 the differential pressure applied to pressure sensor 116 is zero.

At this point, the output voltage of amplifier 174 should be zero. The processor 160 samples the voltage present at output 184 by way of feedback path 192 to processor input 186. If the voltage is not zero, processor 160 adjusts the output of amplifier 174 by adjusting the control voltage present on the zero input 180 of amplifier 174.

Once the output voltage of amplifier 174 is adjusted to zero, span calibration for pressure sensor 116 may commence. Sequencer 148 selects high-pressure reference 152 to be applied to the pneumatic reference input 166 of pneumatic valve 162. The sequencer selects the high-pressure reference of pneumatic reference selector 158 by sending an a logic signal to pneumatic valve 156, commanding it to connect high-pressure reference 152 to pneumatic reference plumb work 143. Since the pneumatic reference is still connected to pneumatic input 172 of pressure sensor 116 through pneumatic valve 162 from the proceeding zero calibration a high pressure reference will be immediately applied to pneumatic input 172 of pressure sensor 116. Since pressure sensor 116's pneumatic input 171 is permanently plumbed to the low-pressure reference 154 of pneumatic reference selector 158 by way of plumb work 145 the differential pressure applied to pressure sensor 116 becomes non-zero.

At this point, the output voltage of amplifier 174 should be equal to a preset value established as a benchmark for all automatic calibration modules. The processor 160 samples the voltage present at output 184 by way of feedback path 192 to processor input 186. If the voltage does not equal the preset benchmark value, processor 160 adjusts the output of amplifier 174 by adjusting the control voltage present on the span input 182 of amplifier 174.

Once the output voltage of amplifier 174 is adjusted to match the preset benchmark value, measurement of the static pressure of paint booth section 102 may commence. Sequencer 148 selects the static pressure of paint booth section 102 to be applied to the pneumatic input 172 of pressure sensor 116. The sequencer selects the static pressure of paint booth section 102 by sending a logic signal to pneumatic valve 162, commanding it to connect pneumatic input 172 of pressure sensor 116 to pneumatic plumb work 124 going to paint booth section 102.

A highly accurate and resolute static pressure measurement is instantaneously transmitted from output 184 of amplifier 174 to airflow controller input 196 by way of communication path 194. Airflow controller 144 compares the pressure measurement from paint booth section 102 to a static pressure benchmark value established to be the same for all paint booth sections. If the static pressure of section 102 does not equal the benchmark pressure, airflow controller 144 will adjust the rotational speed of blower 146A by sending a control signal to blower 146A over blower control bus 198. If the measured static pressure of paint booth section 102 is less than the benchmark value, airflow controller 144 will send a signal to increase the rotational speed of blower 146A and the static pressure of paint booth section 102 will increase. Likewise, if the measured static pressure of paint booth section 102 is greater than the benchmark value, airflow controller 144 will send a signal to decrease the rotational speed of blower 146A and the static pressure of paint booth section 102 will decrease. Very quickly, the static pressure inside paint booth section 102 will settle onto the static pressure benchmark value.

The static pressure of the remaining paint booth sections are controlled in the same way as that described for section 102. In the case of section 103, the sequencer 148 will address and control automatic calibration module 128 and airflow controller 144 will adjust the rotational speed of blower 146B. Likewise, sequencer 148 will address and control automatic calibration modules 134 and 140 and airflow controller 144 will adjust the rotational speed of blowers 146C and 146D for maintaining the benchmark static pressure for sections 104 and 105, respectively.

The sequencer 148 can be set by the user to calibrate each pressure sensor on a fixed schedule, typically every fifteen minutes or so, depending on environmental conditions such as temperature and humidity. Also, the sequencer 148 could use feedback of drift rate data from the automatic calibration modules to determine an automatic calibration schedule. Regardless of whether the calibration schedule is fixed or automatically adjusted by the sequencer 148, the process is cyclical in that ever so often the pressure sensors are automatically recalibrated before the static pressure measurements drift far enough away from calibration to produce noticeable errors.

Certain modifications and improvements will occur to those skilled in the art upon reading the foregoing description. For example, the pressure sensor in one of the sections could be replaced by a flow meter mounted to measure vertical airflow. Since this airflow measurement would be related to the section's static pressure, it could be used as a pneumatic reference for all the other sections. Furthermore, instead of referring to external pneumatic references the static pressure of any paint booth section could be used as a pneumatic reference. It should be understood that all such modifications and improvements have been deleted herein for the sake of conciseness and readability but are properly within the scope of the following claims.

What is claimed is:

1. A system for calibrating pressure sensors in communication with adjacent paint booth sections comprising:
    a) a plurality of pressure sensors, each of said sensors including an amplifier and an amplifier controller, each sensor being in communication with each of said sections;
    b) high and low pressure pneumatic references; and
    c) a processor for sequentially connecting the low and high pressure pneumatic references to each of said sensors, said amplifier controller adjusting said amplifier output to zero based on said low pressure reference, and to a preset value based on said high pressure reference.

2. The system of claim 1 wherein said plurality of pressure sensors responds to differential pressure applied to a first and second port.

3. The system of claim 1 wherein said amplifier controller is a micro-controller.

4. The system of claim 1 wherein said amplifier has adjustable gain and level.

5. The system of claim 1 wherein said low-pressure pneumatic reference is ambient air pressure.

6. The system of claim 1 wherein said high-pressure pneumatic reference is compressed air.

7. The system of claim 1 wherein said processor is a micro-controller.

8. A system for maintaining equal pressure in a plurality of adjacent paint booth sections comprising:
    a) a plurality of pressure sensors, each of said pressure sensors including an amplifier and an amplifier controller, each sensor being in communication with each of said sections;
    b) high and low pressure pneumatic references;
    c) a processor for sequentially connecting the low and high pressure pneumatic references to each of said sensors, said amplifier controller adjusting said amplifier output to zero based on said low pressure reference, and to a preset value based on said high pressure reference; and
    d) an airflow controller in communication with said paint booth sections to control the air pressure in each of said sections, responsive to said pressure sensors.

9. The system of claim 8 wherein said plurality of pressure sensors responds to differential pressure applied to a first and second port.

10. The system of claim 8 wherein said amplifier controller is a micro-controller.

11. The system of claim 8 wherein said amplifier has adjustable gain and level.

12. The system of claim 8 wherein said low-pressure pneumatic reference is ambient air pressure.

13. The system of claim 8 wherein said high-pressure pneumatic reference is compressed air.

14. The system of claim 8 wherein said processor is a micro-controller.

15. A paint booth having a plurality of adjacent sections joined by walls having object transfer openings comprising:
   a) a plurality of pressure sensors, each of said sensors including an amplifier and an amplifier controller, each sensor being in communication with each of said sections;
   b) high and low pressure pneumatic references;
   c) a processor for sequentially connecting the low and high pressure pneumatic references to each of said sensors, said amplifier controller adjusting said amplifier output to zero based on said low pressure reference, and to a preset value based on said high pressure reference; and
   d) an airflow controller in communication with said paint booth sections to control the air pressure in each of said sections, responsive to said pressure sensors.

16. The paint booth of claim 15 wherein said plurality of pressure sensors responds to differential pressure applied to a first and second port.

17. The paint booth of claim 15 wherein said amplifier controller is a micro-controller.

18. The paint booth of claim 15 wherein said amplifier has adjustable gain and level.

19. The paint booth of claim 15 wherein said low-pressure pneumatic reference is ambient air pressure.

20. The paint booth of claim 15 wherein said high-pressure pneumatic reference is compressed air.

21. The paint booth of claim 15 wherein said processor is a micro-controller.

* * * * *